United States Patent [19]
Smith

[11] Patent Number: 5,669,562
[45] Date of Patent: Sep. 23, 1997

[54] TELESCOPING INFEED CONVEYOR

[75] Inventor: Mark A. Smith, Sarasota, Fla.

[73] Assignee: Columbus McKinnon Corporation, Amherst, N.Y.

[21] Appl. No.: 608,442

[22] Filed: Feb. 28, 1996

[51] Int. Cl.$^6$ .................................................. B02B 5/02
[52] U.S. Cl. .................. 241/101.74; 198/313; 198/315; 198/812; 241/DIG. 31
[58] Field of Search .................. 198/313, 315, 198/812; 241/101.74, 101.741, DIG. 31

[56] References Cited

U.S. PATENT DOCUMENTS

| | | | |
|---|---|---|---|
| 1,576,910 | 3/1926 | Hudson . | |
| 3,493,136 | 2/1970 | Spellman, Jr. | 214/509 |
| 4,240,587 | 12/1980 | Letsch | 241/23 |
| 4,655,402 | 4/1987 | Desourdy | 241/76 |
| 4,684,070 | 8/1987 | Dicky | 241/79 |
| 4,813,526 | 3/1989 | Bélanger | 198/313 |
| 5,253,971 | 10/1993 | Weinlader | 414/412 |
| 5,360,097 | 11/1994 | Hibbs | 198/313 |
| 5,395,061 | 3/1995 | Merklinger | 241/101 |

*Primary Examiner*—Joseph E. Valenza
*Attorney, Agent, or Firm*—Bean, Kauffman & Snyder

[57] ABSTRACT

A conveyor system particularly adapted for feeding vehicle tires to a shredder mechanism includes telescopic conveyor sections supported to removably, adjustably position an outlet end of a first conveyor section relative to an inlet opening of the shredder mechanism and to adjustably position an inlet end of a second conveyor section at a convenient elevation for tire loading purposes.

11 Claims, 9 Drawing Sheets

FIG. 5

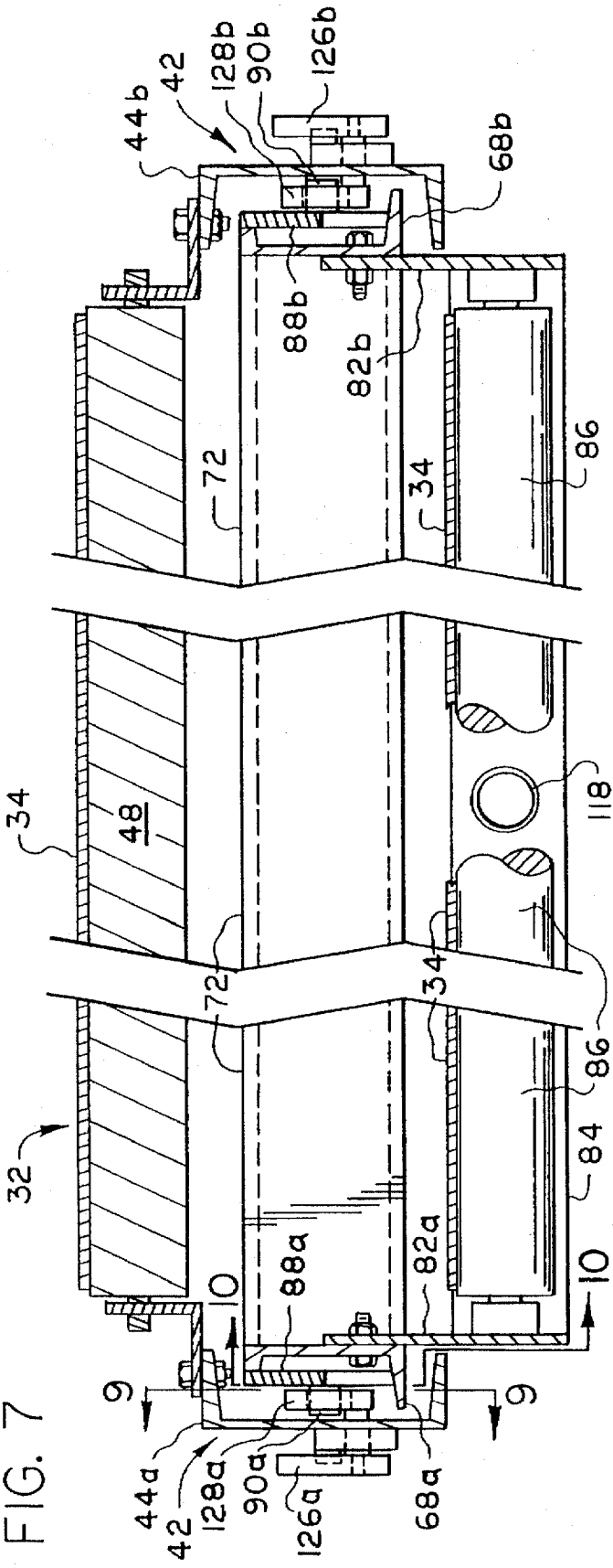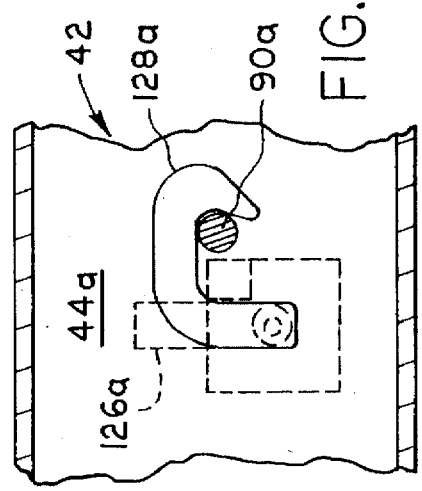

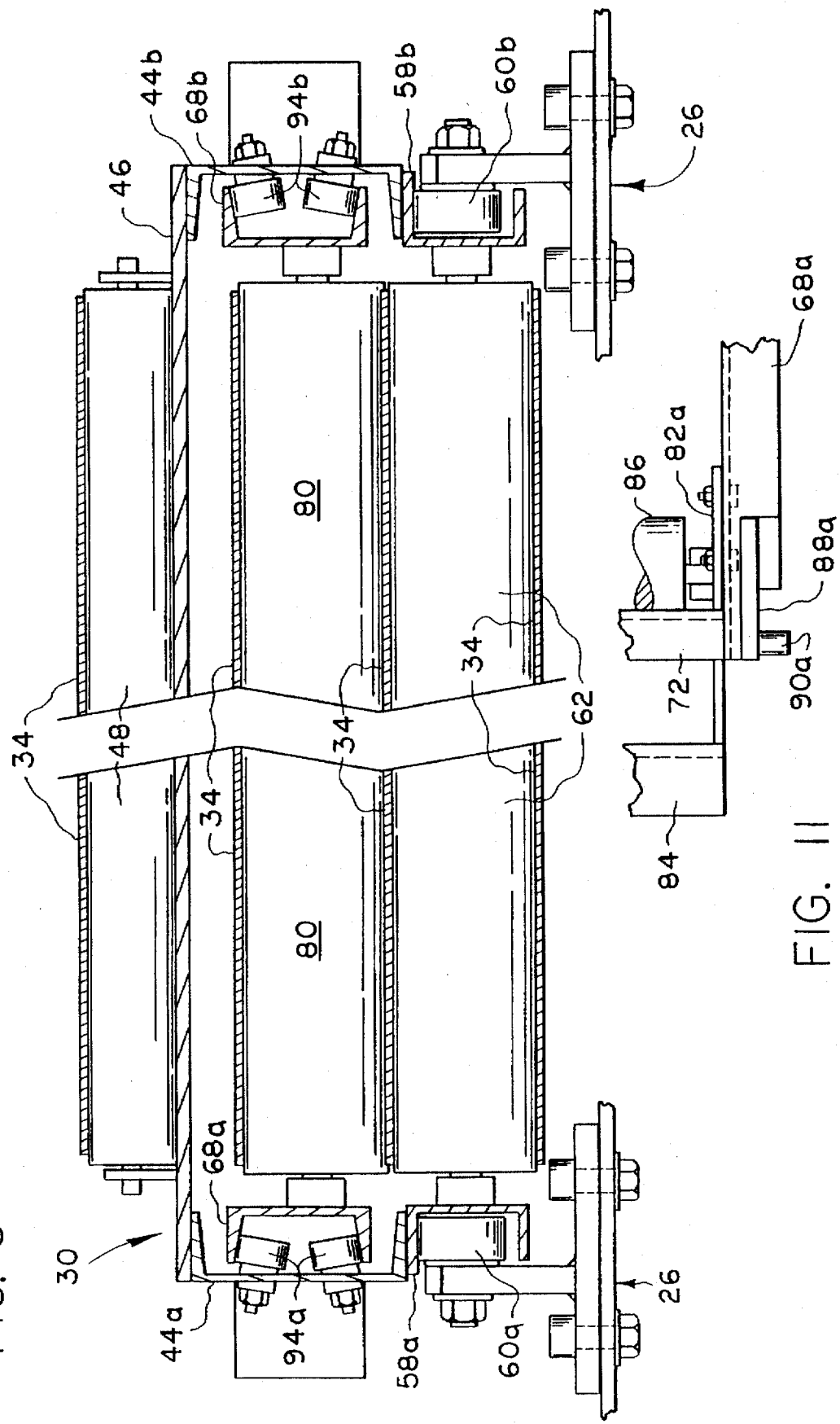

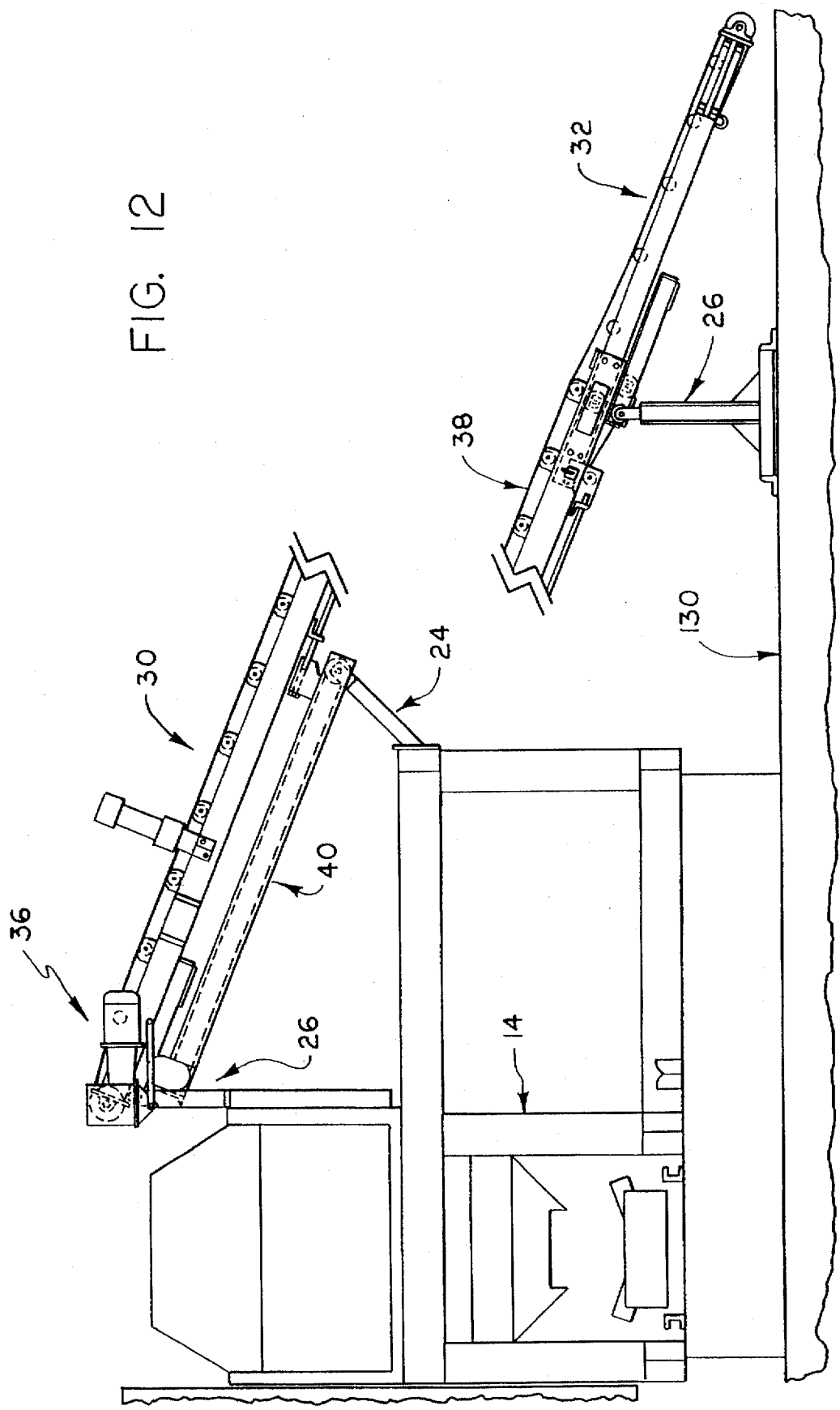

TELESCOPING INFEED CONVEYOR

BACKGROUND OF THE INVENTION

The present invention relates to conveyors and more particularly to conveyors adapted to transport waste material, such as used tires, to a material shredding mechanism.

It has been known to employ an endless belt conveyor to transport used tires from a ground level loading station to an elevated inlet or charging opening of a tire shredding mechanism, as evidenced by commonly assigned U.S. Pat. No. 4,684,070. Prior installations of this type have been permanently mounted or located at a waste receiving area, and not adapted for transport between such areas.

It is also known to mount a conveyor mechanism and a tire shredding mechanism on a movable platform defined by a truck body, as evidenced by U.S. Pat. No. 5,395,061.

SUMMARY OF THE INVENTION

A conveyor mechanism formed in accordance with the present invention is particularly adapted to be mounted, together with a shredding mechanism, on a truck bed or trailer for movement between waste material storage areas at which waste material, such as used tires, is desired to be shredded.

The conveyor mechanism includes first and second conveyor sections, wherein the first conveyor section is supported for movement along a vertically inclined path of travel relative to a tire shredding mechanism to move its discharge end as required to both afford unobstructed access to an inlet or charging opening of the shredding mechanism for cleaning or maintenance purposes and to vary the position of the discharge end relative to such inlet, opening to accommodate for the proper feeding thereinto of tires of different diameter. The second conveyor section is telescopically mounted on the first conveyor section to permit a tire charging or inlet end thereof to be arranged at an elevation facilitating placement of tires thereon. A single drive mechanism is provided for controlling movement of the conveyor sections.

In an alternative arrangement, the conveyor mechanism and shredding mechanism may be permanently mounted at a desired waste material storage area.

BRIEF DESCRIPTION OF THE DRAWINGS

The nature and mode of operation of the present invention will now be more fully described in the following detailed description taken with the accompanying drawings wherein:

FIG. 1 is a side elevational view of the conveyor of the present invention shown in contracted or transport position for movement with a suitable truck or the like;

FIG. 5 is an enlarged view of the area designated as "A" in FIG. 1;

FIG. 7 is an enlarged sectional view taken generally along the line 7—7 in FIG. 6;

FIG. 8 is an enlarged sectional view taken generally along the line 8—8 in FIG. 6;

FIG. 9 is an enlarged sectional view taken generally along the line 9—9 in FIG. 7;

FIG. 10 is an enlarged sectional view taken generally along the line 10—10 in FIG. 7;

FIG. 11 is a top plan view of the structure of FIG. 10; and

FIG. 12 is a view showing the conveyor of the present invention mounted in a fixed position.

DETAILED DESCRIPTION

Figure 1:
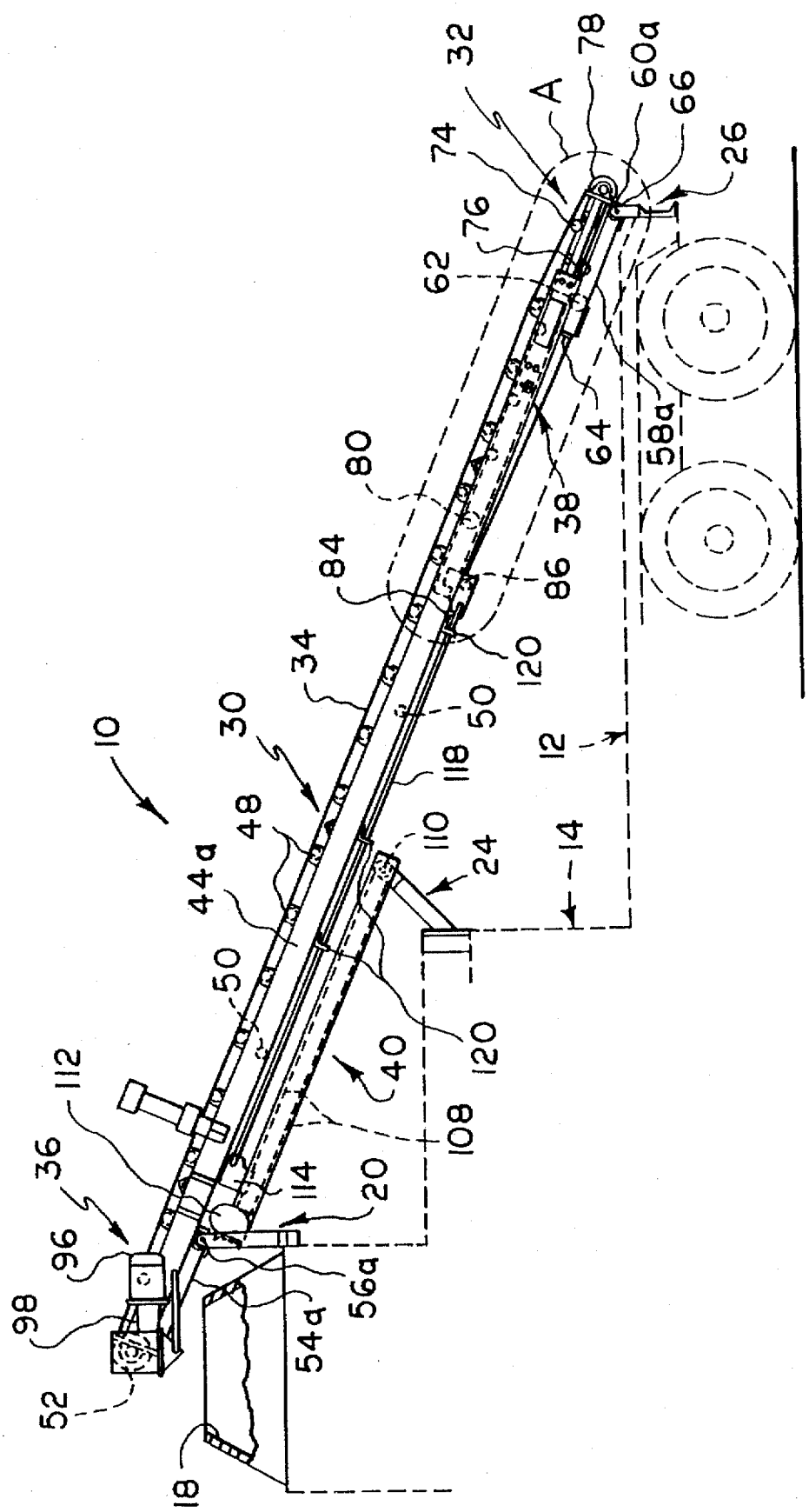

Reference is first made to FIGS. 1–4, wherein a conveyor formed in accordance with a preferred form of the present invention is generally designated as 10 and shown as being mounted on a truck body or trailer 12 in operative association with a shredder mechanism 14 for transport to and from storage areas for solid waste material, such as scrap tires, not shown. The specific construction of truck body 12 and shredder mechanism 14 forms no part of the present invention. However, as by way of illustration, shredder mechanism 14 may be a tire-shredding mechanism of the type disclosed in commonly assigned U.S. Pat. No. 4,684,070, wherein a suitable sized inlet or charging opening 18 is provided for charging the mechanism with scrap tires.

Conveyor 10 may be suitably supported, such as by support members 20 and 24 upstanding from shredder mechanism 14 and support members 26 upstanding from adjacent a rear end of truck body 12.

Again referring to FIGS. 1–4, conveyor 10 is shown as generally comprising a first conveyor section 30 having its upper and lower ends supported by support members 20 and 26 to permit movement thereof along a vertically inclined path of travel between the upper and lower limiting positions shown in FIGS. 1 and 2, respectively; a second conveyor section 32 supported by the first conveyor section for relative telescopic movement; an endless conveyor belt 34 trained about the conveyor sections; a belt drive mechanism 36; a belt accumulating mechanism 38 for permitting the effective length of the conveyor belt to be varied incident to telescopic movement of the conveyor sections; a telescopic drive mechanism 40; and a conveyor section latch mechanism 42. It will be understood that the lower end of second conveyor section 32 is an inlet or charging end intended to be located at a convenient height adjacent a loading station at which scrap tires are suitably loaded onto the conveyor and that the upper end of first conveyor section 30 is a discharge end intended to supply tires to inlet or charging opening 18 of shredder mechanism 14.

Figure 6:
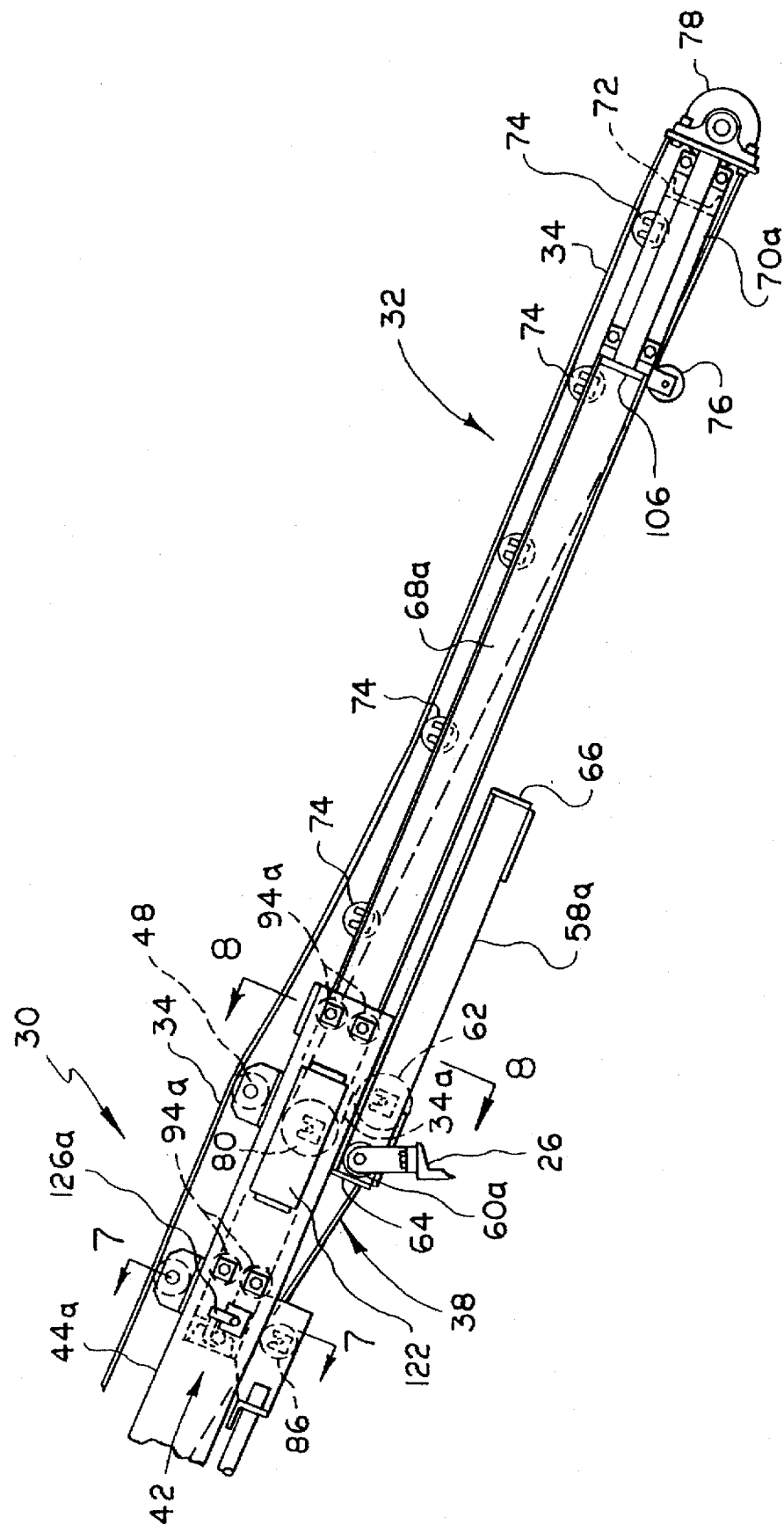
FIG. 6 is an enlarged view of the area designated as "B" in FIG. 3.

First conveyor section 30 includes a pair of elongated, facing U-shaped support channels 44a and 44b, which are fixed in parallel relationship by a plurality of bridging members 46 and cooperate to mount opposite ends of a plurality of parallel, rotatable upper and lower belt guide rollers 48 and 50, respectively, and an upper end belt drive roller 52. Relatively upper ends of channels 44a and 44b mount a pair of upper guide flanges, only one of which is shown at 54a, which have downwardly facing surfaces arranged to engage with a pair of support rollers, only one of which is shown at 56a, journalled on support member 20. Relatively lower ends of channels 44a and 44b are best shown in FIGS. 6 and 8 as mounting a pair of lower guide flanges 58a and 58b, which have downwardly facing surfaces arranged to engage with a pair of lower support rollers 60a and 60b journalled on support members 26. Guide flanges 58a and 58b serve to rotatably support opposite ends of a direction change, belt guide roller 62 and to provide a fixed support for upper and lower stop flanges 64 and 66 arranged for abutting engagement by lower support rollers 60a and 60b, thereby to define the permissible extent of movement of first conveyor section 30 along its inclined path of travel relative to shredder mechanism 14.

Second conveyor section 32 includes a pair of elongated oppositely facing or opening, U-shaped support channels 68a and 68b connected adjacent their lower ends to a pair of bearing extension flanges, only one of which is shown at 70a. These support channels and their associated bearing extension flanges are maintained in parallel relationship by a plurality of bridging members 72 and serve to mount upper and lower belt guide rollers 74 and 76, respectively; a lower end belt guide roller 78; and a direction change, belt guide roller 80. The upper ends of channels 68a and 68b mount a pair of connector plates 82a and 82b, which in turn cooperated to support opposite ends of a transversely extending connector member 84 and opposite ends of a rotatable guide roller 86. The upper ends of channels 68a and 68b additionally mount a pair of L-shaped plates 88a and 88b, which in turn mount a pair of latch pins 90a and 90b aligned to extend horizontally in opposite directions.

Second conveyor section 32 is mounted for telescopic movement on first conveyor section 30 by a plurality of pairs of support rollers 94a and 94b carried by channels 44a and 44b for engagement with facing flange surfaces of channels 68a and 68b, as best shown in FIG. 8.

Belt 34 is shown in FIGS. 1-6 as having an upper or transport flight extending from adjacent lower end guide roller 78 successively across upper guide rollers 74 and upper guide rollers 48 to belt drive roller 52; and a lower or return flight extending from belt drive roller 52 successively across lower guide rollers 50, lower guide roller 86, direction change roller 62, direction change roller 80 and lower guide roller 76 to lower end guide roller 78.

Belt drive mechanism 36 is shown generally in FIGS. 1-4 as including a motor 96 coupled to a transmission 98 whose output is in turn coupled to upper end belt drive roller 52. During normal operation of conveyor 10, operation of motor 96 effects driven rotation of belt drive roller 52 in a counter-clockwise direction, as viewed in FIGS. 1-4, thereby to affect travel of conveyor belt in the direction indicated by arrow 102 in FIG. 4.

Figure 5:
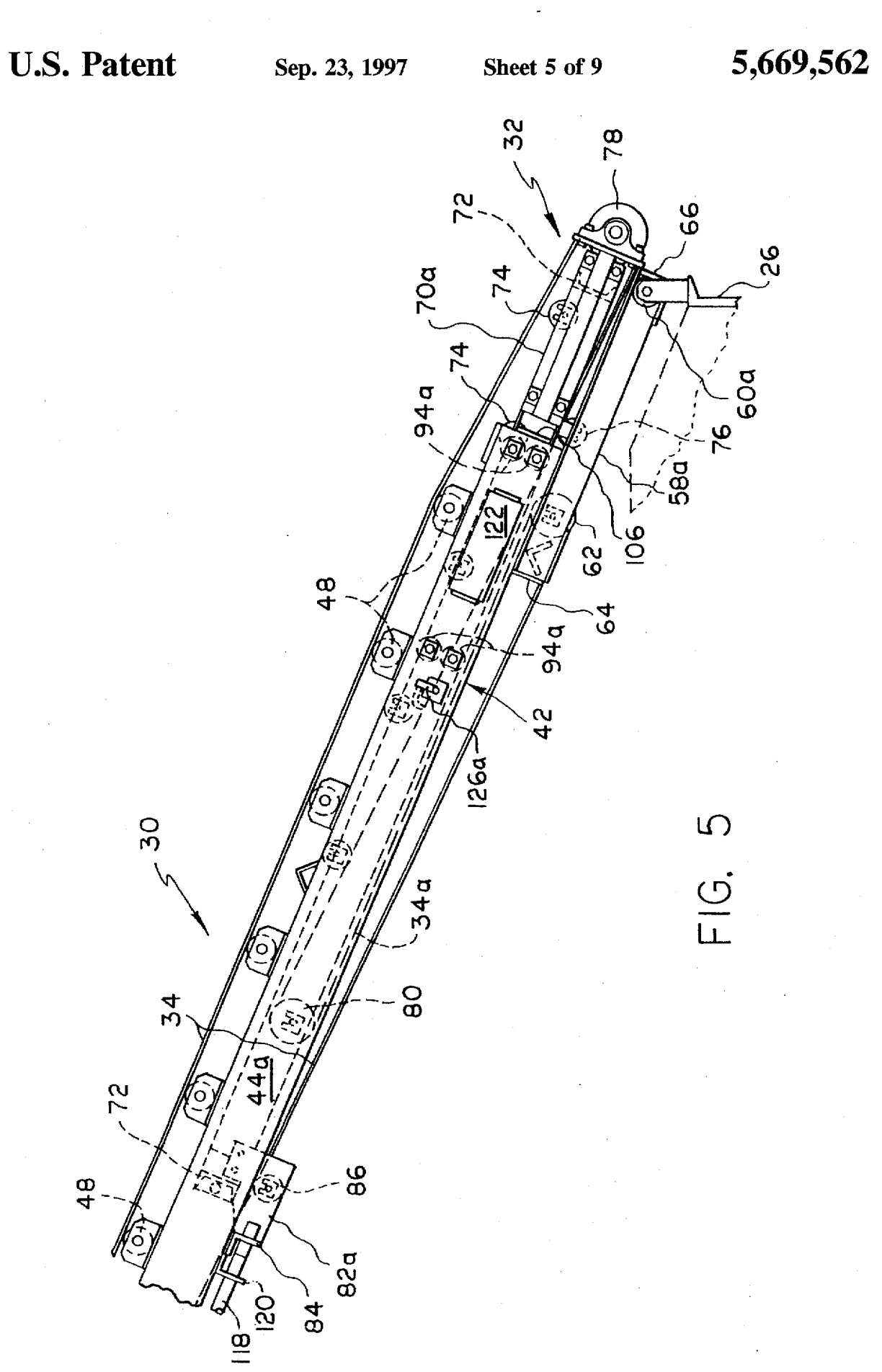

Belt accumulating mechanism 38 is best shown in FIGS. 5 and 6, as comprising belt guide roller 62 and belt guide roller 80, which cooperate to vary the effective length of belt extending therebetween, such length being designated as 34a. Belt length 34a is shown as having a minimum valve when second conveyor section 32 is fully extended, as shown in FIG. 6, and as having a maximum valve when the second conveyor section is fully retracted, as shown in FIG. 5. As will be understood by referring to FIG. 5, the fully retracted position of second conveyor section 32 is defined by abutting engagement of the lower ends of support channels 44a and 44b, with a pair of stop members, only one of which is shown at 106, fixed one to each of support channels 68a and 68b.

Telescopic drive mechanism 40 is shown generally in FIGS. 1-4 as including a drive chain 108 trained about an idler sprocket 110 journalled on support member 24 and a drive sprocket, not shown, adapted to be selectively driven by a suitable drive mechanism 112, such as may be defined by an electrically driven chain hoist. Drive mechanism 112 may be suitably mounted on support member 26. A link connector 114 is suitably fixed to drive chain 108 for movement therewith and to an upper end of an elongated rod or shaft 118, which is slidably supported by guide plates 120 fixed to extend transversely between support channels 44a and 44b of first conveyor section 30. A lower end of rod 118 is fixed to connector member 84, whereby to couple second conveyor section 32 for extending and retracting telescopic movement relative to first conveyor section 30 incident to oppositely directed movements of drive chain 108. Operation of drive mechanism 112 may be suitably controlled, such as by a remote control box 122, mounted on support channel 44a adjacent the lower end of first conveyor section 30.

Conveyor latch mechanism 42 includes a pair of manually operable handles 126a and 126b, which are rotatably mounted one on each of support channels 44a and 44b and adapted to carry latch hooks 128a and 128b sized and arranged to removably engage with latch pins 90a and 90b for purposes of releasably retaining second conveyor section 32 latched or fixed relative to first conveyor section 30 in the extended position shown in FIG. 6.

Conveyor 10 is intended to be transported to and from a storage area for solid waste material, while disposed in a normal transport position shown in FIG. 1. After truck body 12 has been located in the storage area with the lower or charging end of second conveyor section 32 positioned in a loading station adjacent to a source of scrap tires, drive mechanism 112 is energized to effect movement of drive chain 108 in a clockwise direction, as viewed in FIG. 1, thereby to drive second conveyor section 32 to move into its lowermost position shown in FIG. 3. The weight of first conveyor section 30 forces it to roll downwardly along its inclined path of travel along with second conveyor section 32 until movement of the first conveyor section is arrested by engagement of stops 68 with rollers 60a and 60b. At this point, latch hooks 126a and 126b are aligned for manually controlled engagement with latch pins 90a and 90b for purposes of releasably latching the first and second conveyor sections together for conjunctive movement.

The next step is that of energizing drive mechanism 112 to effect movement of drive chain 118 in a counter-clockwise direction, as viewed in FIG. 1-4, as required to properly position upper end roller 52 for vertical alignment with shredder inlet opening 18, whereafter shredding of tires may commence when motor 96 is energized to effect movement of belt 34 in the direction designated by arrow 102. It will be understood that the tire feeding position of conveyor 10 shown in FIG. 4 may be adjusted to vary the position of upper end roller 52 relative to shredder opening 18 dependent upon the diameter of tire being transported to the shredder.

Figure 2:
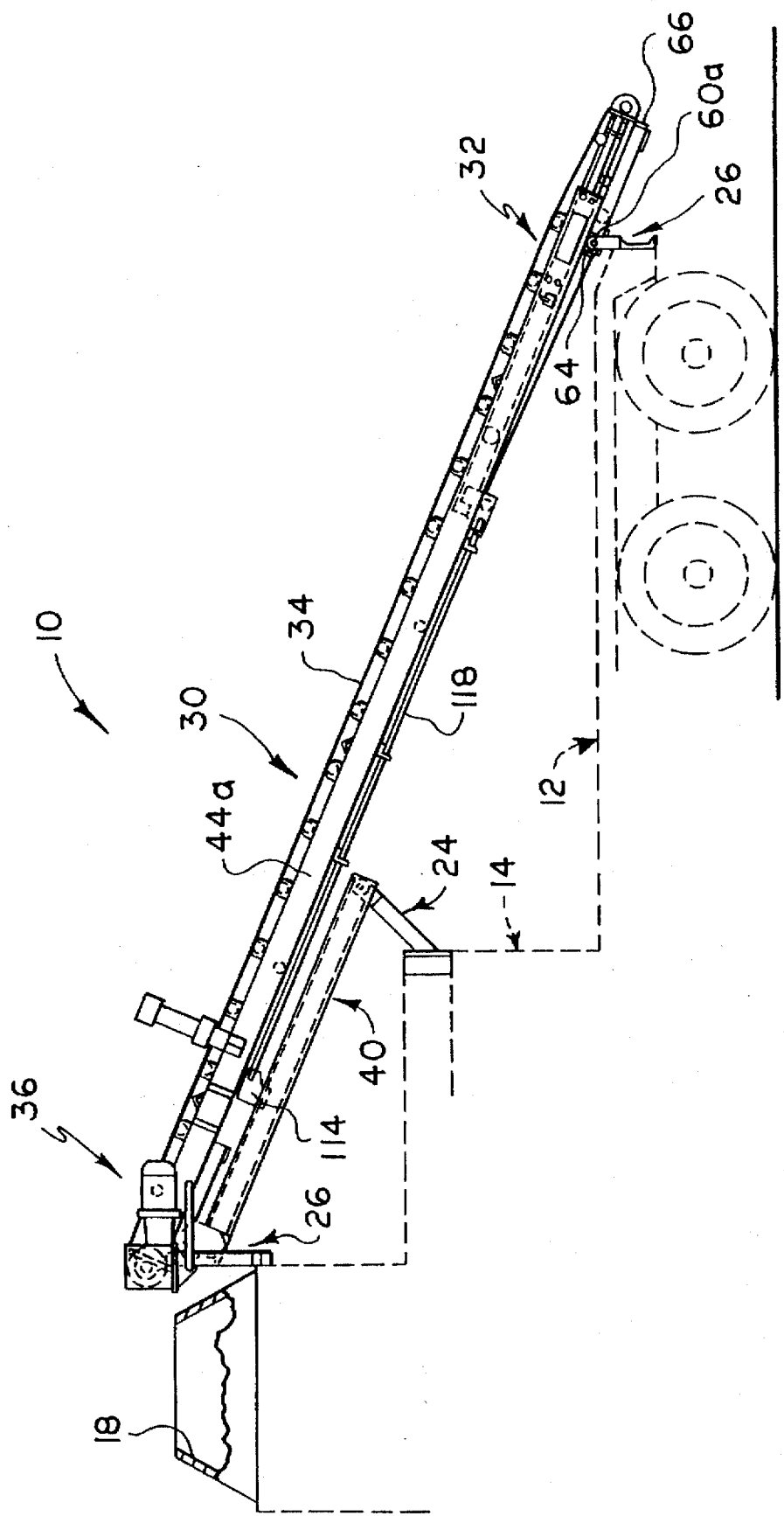
FIG. 2 is a view similar to FIG. 1, but showing the conveyor adjusted to remove the discharge end of the conveyor from vertical alignment with an inlet or charging opening of a tire-shredding mechanism.
Figure 3:
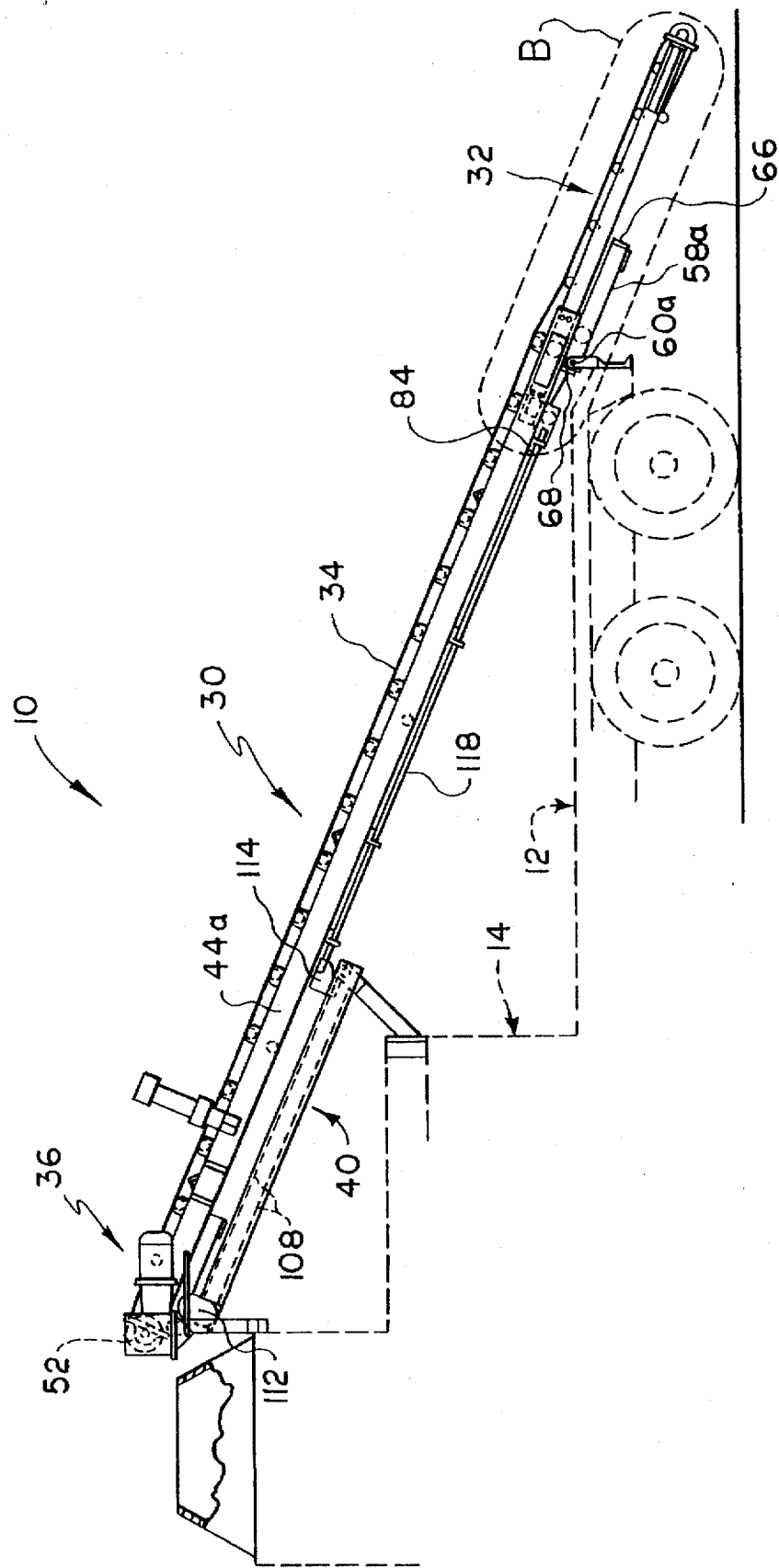
FIG. 3 is a view similar to FIG. 2, but showing the conveyor in fully-extended condition.
Figure 4:
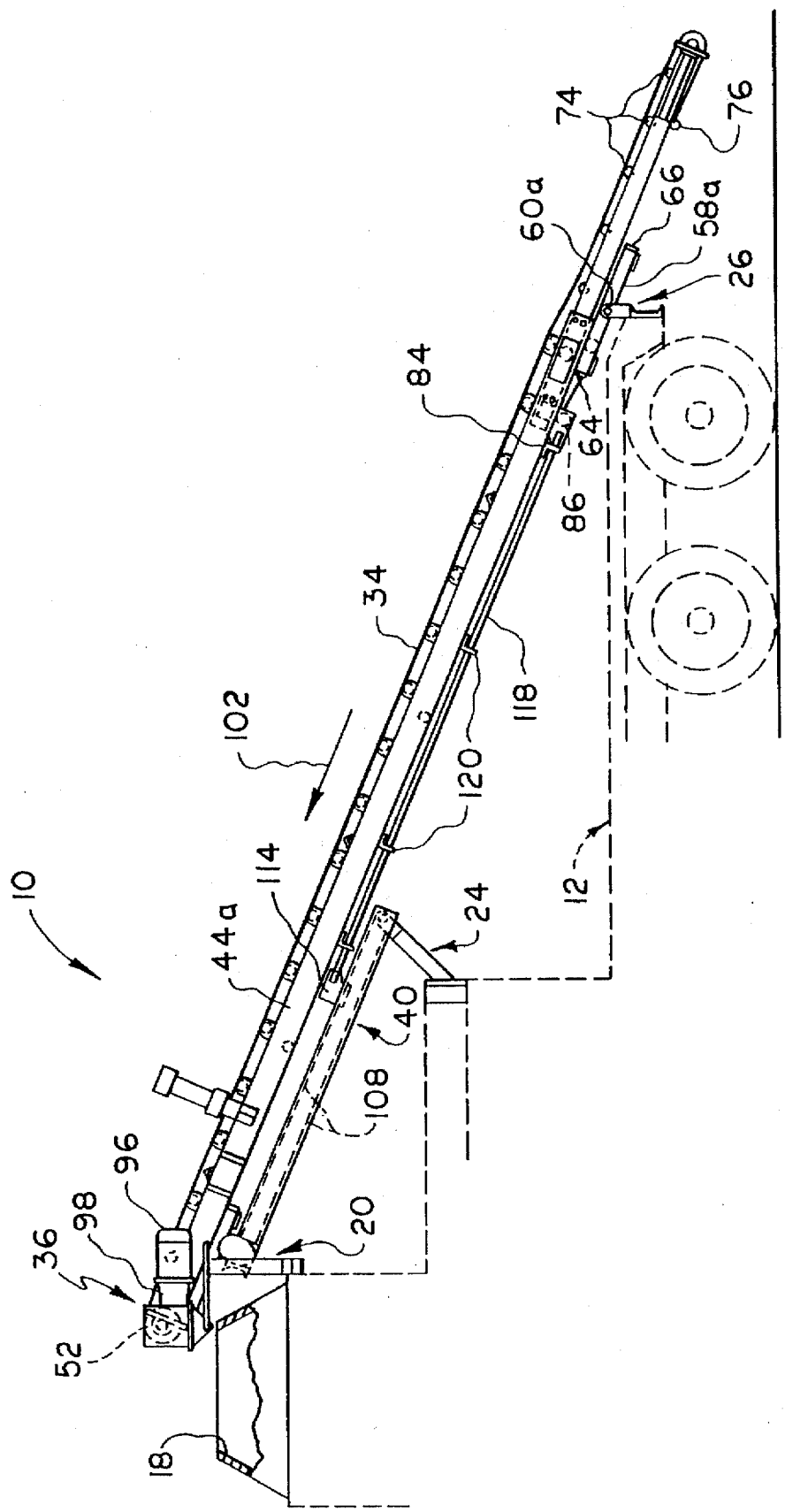
FIG. 4 is a view similar to FIG. 3, but showing the conveyor displaced to arrange its discharge end in overlying relation relative to the inlet of the shredded mechanism.

Whenever access to the interior of shredder 14 through opening 18 is required for maintenance/cleaning purposes, the discharge end of conveyor section 30 may be temporarily removed from overlying relation to opening 18, as well as the removably housing bounding such opening, as indicated in FIG. 2. Maintenance can also be performed, if desired, when conveyor 10 is in the position thereof shown in FIG. 3, since in this position, the discharge end of conveyor section 30 is also removed from overlying relation to opening 18. Thereafter, conveyor 10 may be returned to its normal operative position shown in FIG. 4 to permit additional tires to be shredded.

After shredding of tires at a given site is completed, conveyor 10 may be returned to its initial or transport position shown in FIG. 1.

While conveyor 10 of the present invention is preferably intended for movement from site to site, it may none-the-less, if desired, be permanently mounted at a given site whereat movement of the conveyor is normally limited to movement thereof from a maintenance/cleaning position into a tire feeding position. If desired, the construction of the conveyor of FIG. 12 may be identical to that described with reference to FIGS. 1–11, with the exception that shredder 14 and support members 26 may be conveniently mounted on a fixed bed or slab 130.

What is claimed is:

1. A conveyor mechanism adapted for use in transporting material from a loading station upwardly for discharge downwardly into a charging opening of a shredder mechanism, said conveyor mechanism comprising:

a first conveyor section having a discharge end;

a second conveyor section having a loading end, said second conveyor section being supported by said first conveyor section for telescopic movement with said discharge and loading ends being remotely disposed in relation to one another;

means for defining a limit of contracting telescopic movement of said second conveyor section relative to said first conveyor section;

means for supporting said first conveyor section for movement along a vertically inclined path of travel between spaced positions in which said discharge end is disposed in overlying relation to said charging opening and removed from overlying relation to said charging opening;

a driven conveyor belt trained about said first and second conveyor sections for transporting material from said loading end to said discharge end;

a belt accumulator mechanism for varying the effective length of said belt incident to said telescopic movement;

a drive means for moving said second conveyor section in opposite directions along said vertically inclined path of travel; and latch means for releasably latching said first conveyor section to said second conveyor section for conjunctive movement.

2. A mechanism according to claim 1, wherein said conveyor mechanism and said shredded mechanism are mounted on a common movable transport.

3. A mechanism according to claim 1, wherein said drive means includes a rod extending lengthwise of said path of travel and having first and second ends, and means fixed to said first end of said rod for moving said rod in opposite directions lengthwise thereof, and said second conveyor section is fixed to said second end of said rod for movement therewith.

4. A mechanism according to claim 1, wherein said drive means includes an elongated rod slidably supported by said first conveyor section in alignment with said path of travel and having upper and lower ends, said lower end being connected to said second conveyor section and said upper end being connected to means adapted to alternatively move said upper end of said rod in opposite directions lengthwise of said path of travel.

5. A mechanism according to claim 4, wherein said reversible drive means includes a chain, a connector plate coupled to said upper end of said rod and said chain and a chain drive for driving said chain for movement in opposite directions.

6. In the combination of a shredder mechanism having a charging opening and a driven conveyor having inlet and discharge ends for moving waste material from a loading station for deposit in said charging opening, wherein both said shredder mechanism and said conveyor are mounted on a common transport for movement therewith, the improvement comprising:

said conveyor having first and second conveyor sections defining said discharge and inlet ends, respectively;

means for supporting said first conveyor section for movement along a vertically inclined path of travel;

stop means for defining a lower position of said first conveyor section along said path of travel, wherein said discharge end is removed from overlying relation with said charging opening;

means for supporting second conveyor section on said first conveyor section for movement relative thereto in a direction aligned with said path of travel between contracted and extended positions;

means for moving said second conveyor section upwardly and downwardly along said path of travel;

means to define said contracted position;

a driven conveyor belt trained about said conveyor sections;

accumulated means for varying the effective length of said conveyor belt incident to said movement of said second conveyor section relative to said first conveyor section; and means to releasably latch said conveyor sections for conjunctive movement.

7. The combination according to claim 6, wherein said means for supporting said first conveyor section and said means for supporting said second conveyor section include a plurality of rollers.

8. The combination according to claim 6, wherein said means for supporting said first conveyor section includes support rollers and said stop means includes at least one of said support rollers and a stop carried by said first conveyor section.

9. The combination according to claim 6, wherein said means for moving said second conveyor section, includes a driven chain, a rod, means connecting one end of said rod to said drive chain and another end of said rod to said second conveyor, and said rod is slidably supported by said first conveyor section.

10. The combination according to claim 9, wherein said means for supporting said first conveyor section and said means for supporting said second conveyor section include a plurality of rollers.

11. The combination according to claim 9, wherein said means for supporting said first conveyor section includes support rollers and said stop means includes at least one of said support rollers and a stop carried by said first conveyor section.

* * * * *